(12) United States Patent
Duparre (10) Patent No.: US 7,773,317 B2
(45) Date of Patent: Aug. 10, 2010

(54) LENS SYSTEM WITH SYMMETRICAL OPTICS

(75) Inventor: Jacques Duparre, Jena (DE)

(73) Assignee: Aptina Imaging Corp., Grand Cayman (KY)

( * ) Notice: Subject to any disclaimer, the term of this patent is extended or adjusted under 35 U.S.C. 154(b) by 197 days.

(21) Appl. No.: 12/216,244

(22) Filed: Jul. 1, 2008

(65) Prior Publication Data

US 2010/0002314 A1  Jan. 7, 2010

(51) Int. Cl.
  *G02B 9/04* (2006.01)
(52) U.S. Cl. .................. 359/793; 359/794; 359/796
(58) Field of Classification Search ............... 359/708, 359/717, 793, 794, 796
  See application file for complete search history.

(56) References Cited

U.S. PATENT DOCUMENTS

| | | | |
|---|---|---|---|
| 5,000,552 | A | 3/1991 | Simpson, Jr. et al. |
| 6,049,430 | A | 4/2000 | Heanue et al. |
| 6,457,645 | B1 | 10/2002 | Gardner, Jr. |
| 6,679,964 | B2 | 1/2004 | Lee et al. |
| 6,940,891 | B2 | 9/2005 | Clary et al. |
| 6,995,901 | B2 | 2/2006 | Heffelfinger |
| 7,173,774 | B2 | 2/2007 | Ning |
| 7,208,771 | B2 | 4/2007 | Kathman et al. |
| 7,457,053 | B2 * | 11/2008 | Oh et al. ............ 359/793 |
| 2003/0190803 | A1 | 10/2003 | Harchanko et al. |
| 2005/0231626 | A1 | 10/2005 | Tuttle et al. |
| 2005/0249487 | A1 | 11/2005 | Gutierrez |
| 2005/0275750 | A1 | 12/2005 | Akram et al. |
| 2007/0029277 | A1 | 2/2007 | Jacobowitz et al. |
| 2007/0200132 | A1 | 8/2007 | Kathman et al. |
| 2007/0241265 | A1 | 10/2007 | Yafuso |
| 2007/0255098 | A1 | 11/2007 | Wang et al. |
| 2007/0258711 | A1 | 11/2007 | Mihara et al. |
| 2007/0275505 | A1 | 11/2007 | Wolterink et al. |

FOREIGN PATENT DOCUMENTS

| | | |
|---|---|---|
| CA | 502896 | 5/1954 |
| EP | 0 467 240 A1 | 1/1992 |
| EP | 1 389 804 A2 | 2/2004 |
| EP | 1 772 908 A2 | 4/2007 |
| GB | 791311 | 2/1958 |
| GB | 1 269 133 | 4/1972 |
| JP | 2007-097192 | 4/2007 |

OTHER PUBLICATIONS

R. Volkel, et al., "Miniaturization of Imaging Systems," MST/MEMS for production engineering, mstnews Feb. 2003, pp. 36-38, http://www.suss-microoptics.com/downloads/Publications/Miniaturization_of_Imaging_Systems.pdf.
Jose Sasian, "From the landscape lens to the planar lens: a reflection on teaching lens design," College of Optical Sciences, University of Arizona, http://www.optics.arizona.edu/sasian/opt517/Word_Docs/classical%20lenses.pdf.

* cited by examiner

*Primary Examiner*—Timothy J Thompson
(74) *Attorney, Agent, or Firm*—Dickstein Shapiro LLP (57) ABSTRACT

A lens system comprising an inner lens structure and an outer lens structure. The inner lens structure comprises an inner positive lens, a first transparent substrate and an inner negative lens. The outer lens structure comprises an outer positive lens, a second transparent substrate and an outer negative lens.

37 Claims, 10 Drawing Sheets

LENS SYSTEM WITH SYMMETRICAL OPTICS

FIELD OF THE INVENTION

Embodiments of the invention are directed to lens system apparatuses.

BACKGROUND OF THE INVENTION

Conventional cameras use lens systems comprised of substantially spherical lenses. General design principles are applied to reduce aberrations and to achieve a desired image quality. When less aberration is desired, more lens elements are added. Examples of general structural design principles used in conventional camera lenses include symmetry around the system aperture, combining large diameter lenses with small diameter lenses, combining low dispersion (Abbe number>50) and high dispersion lenses (Abbe number<50), use of substantially spherical lenses, use of additional aspherical lenses, use of thin and strongly bent lenses and use of artificial vignetting.

Lenses used in wireless telephones (e.g., cellular telephones) present a unique challenge because they must be compact, inexpensive, used with a digital pixel array and provide a high-quality picture. To achieve these goals, designers have used wafer-level optics (WLO), which involves packaging small lenses with the digital circuitry, including a pixel array. Currently, however, lenses used in wafer-level optics are highly aspheric, or "free form," often with aspheric coefficients of the 10th to 14th order, unlike lenses used in more traditional cameras.

Figure 1:
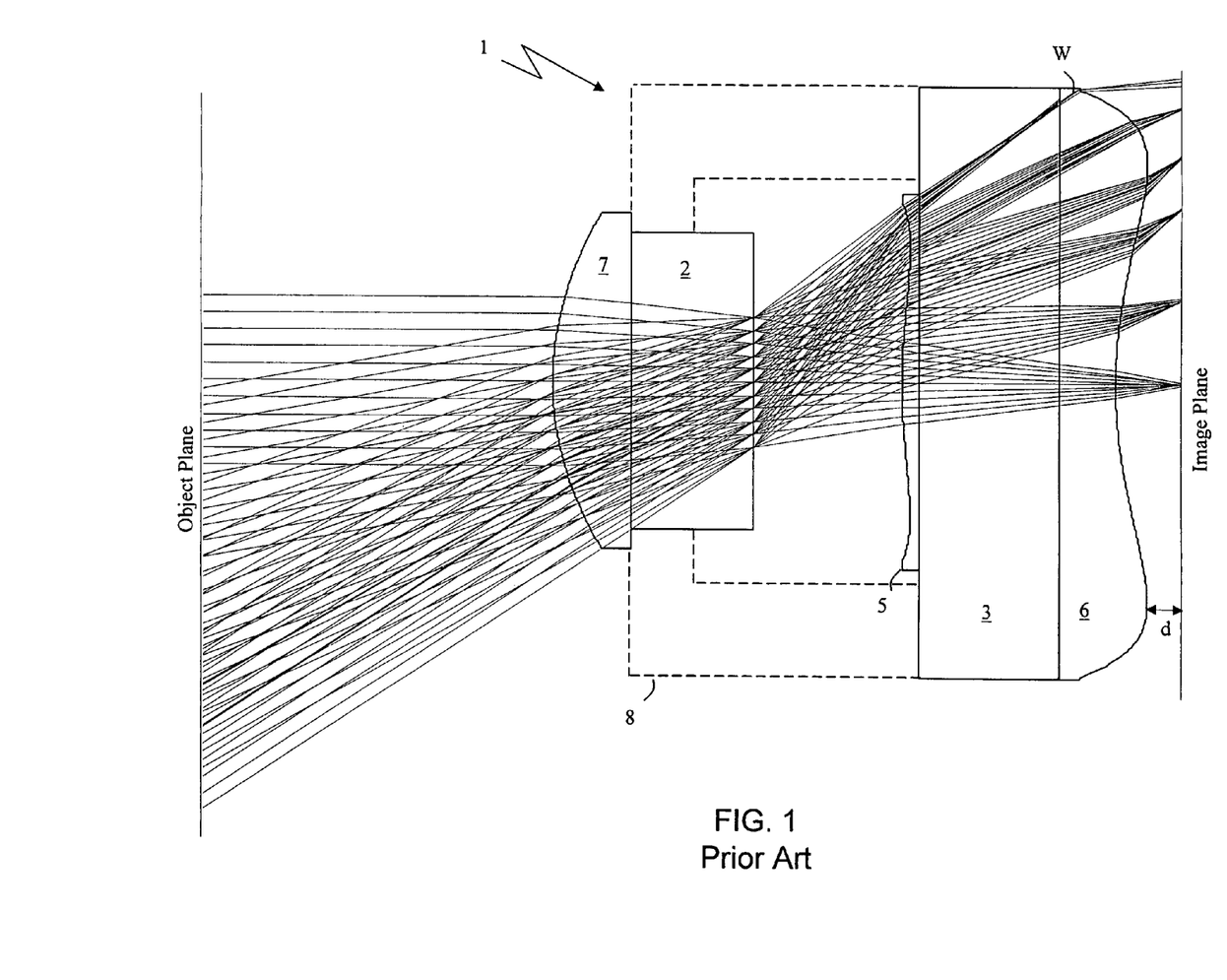
FIG. 1 is a cross-sectional view of a prior art lens apparatus.

FIG. 1 shows an example of a packaged lens system 1 used in a cell phone camera. Lens system 1 has an outer lens substrate 2 and an inner lens substrate 3, wherein inner lens substrate 3 is between outer lens substrate 2 and the image plane on a pixel array. Outer lens substrate 2 has one positive lens 7, and inner lens substrate 3 has two highly aspheric, or "free form" lenses 5, 6. Outer lens substrate 2 may have a second lens as well. Lens system 1 includes a spacer 8 that is connected to inner lens substrate 3 and outer lens substrate 2 and fixes the lenses in the position shown in FIG. 1.

In current wafer-level lens designs such as the illustrated lens system 1, there is a lack of symmetry and thus strong ray bending (e.g., ray bundle W) to achieve a short total track of the imaging systems with a comparatively large focal length and small chief ray angle (CRA). Aberrations introduced by these strict specifications are reduced by introducing free form lenses 5, 6 with high order aspheric coefficients. These free form lenses actually cause an increase in aberrations if, by the influence of fabrication tolerances, the ray bundles do not follow their expected path through the lenses. To reduce size, lens system 1 requires lens 6 be separated from the image plane by distance d, which also requires that lens 6 have a larger diameter than would be required if lens 6 were farther from the image plane. Moreover, fabrication and testing of free form structures can be complicated.

Figure 2:
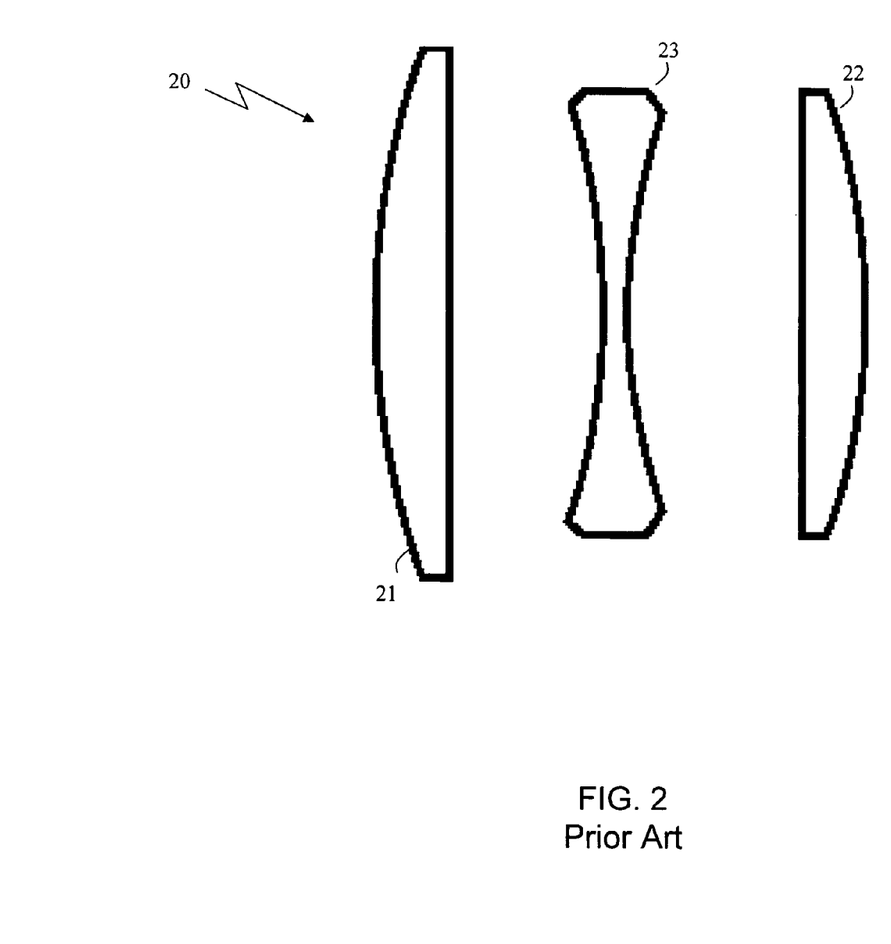
FIG. 2 is a cross-sectional view of a prior art lens apparatus.

General design principles used in conventional camera lenses can remedy many of the issues experienced in current cell phone camera lens systems. One known implementation of some of the general design principles is the Cooke Triplet 20 shown in FIG. 2. The Cooke Triplet 20 is a configuration of an inner negative lens 23 and two outer positive lenses 21, 22. Due to the "triplet" configuration of the Cooke Triplet 20, requiring three individual lens structures 21, 22, 23, the Cooke Triplet 20 can be excessively large, thus increasing the cost of materials. Furthermore, fabrication at a wafer level can be expensive using conventional methods and materials.

General design principles used in conventional cameras are currently neglected in cell phone cameras. The application of these rules, however, requires maximizing system symmetry, meaning that the maximum chief ray angle (CRA) on the image sensor is sufficiently equal to the corresponding maximum field of view angle.

Accordingly, there is a need and a desire for a simple, small and inexpensive lens design that incorporates general optics design principles by maximizing system symmetry.

DETAILED DESCRIPTION OF THE INVENTION

In the following detailed description, reference is made to various embodiments that are described with sufficient detail to enable those skilled in the art to practice them. It is to be understood that other embodiments may be employed, and that various structural or logical changes may be made.

Various embodiments described herein relate to a lens system configured using many general principles of optical system design. The various embodiments employ a lens design as symmetrical in object and image space as possible, which means the maximum chief ray angle (CRA) on the image sensor is not much smaller than the corresponding maximum field of view angle. Specifically, if the angle of incidence (AOI) is a chief ray incident within the field of view, the relationship between the angle of incidence and the corresponding chief ray angle is defined as:

$$0.75*AOI \leq CRA \leq 1.25*AOI$$

Preferably, the relationship between the between the angle of incidence and the corresponding chief ray angle is defined as:

$$0.9*AOI \leq CRA \leq 1.1*AOI$$

A symmetrical system will correct the aberrations coma, distortion and lateral color and improve tolerances, feasibility and yield. To reduce field curvature aberrations, various embodiments combine lenses of varying diameters. To reduce chromatic aberration various embodiments combine low dispersion lenses with high dispersion lenses. While prior art devices employ multiple highly aspheric, free-form lenses which create and then overcorrect severe aberrations, embodiments described herein use aspheric lenses with only low order aspheric coefficients (e.g., $6^{th}$ or $8^{th}$ order), which create and correct smaller aberrations and allow for greater tolerances.

Moreover, various embodiments described herein use artificial vignetting for further reducing off-axis aberrations, spurious light and lens flare. The embodiments described herein do not require a spacer to separate the lens substrates from each other because lens replication layers can be bonded directly together. In one embodiment, the lens system can be used in a video graphics array (VGA) module. Embodiments described herein place the lens system farther from the image plane than the conventional packaged lens assembly of FIG. 1 allowing use of smaller diameter lenses, thus reducing size and cost, and allowing for more non-lens surface area for bonding to create a stronger lens system.

Furthermore, various embodiments described herein relate to a lens system configured as a "doublet" with similar functionality to the Cooke Triplet. The doublet configuration utilizes two lens structures, instead of the three structures used in the Cooke Triplet, thus making the doublet smaller and less expensive to fabricate. In addition, methods for manufacturing embodiments described herein are described in U.S. patent application Ser. No. 12/146,306, filed Jun. 25, 2008, now U.S. Pat. No. 7,710,667, entitled Imaging Module With Symmetrical Lens System and Method of Manufacture, assigned to Micron Technology, Inc., and incorporated herein by reference. It should be understood that the drawings contained herein are not to scale and parts of the apparatuses shown are enlarged or reduced for clarity.

Figure 3:
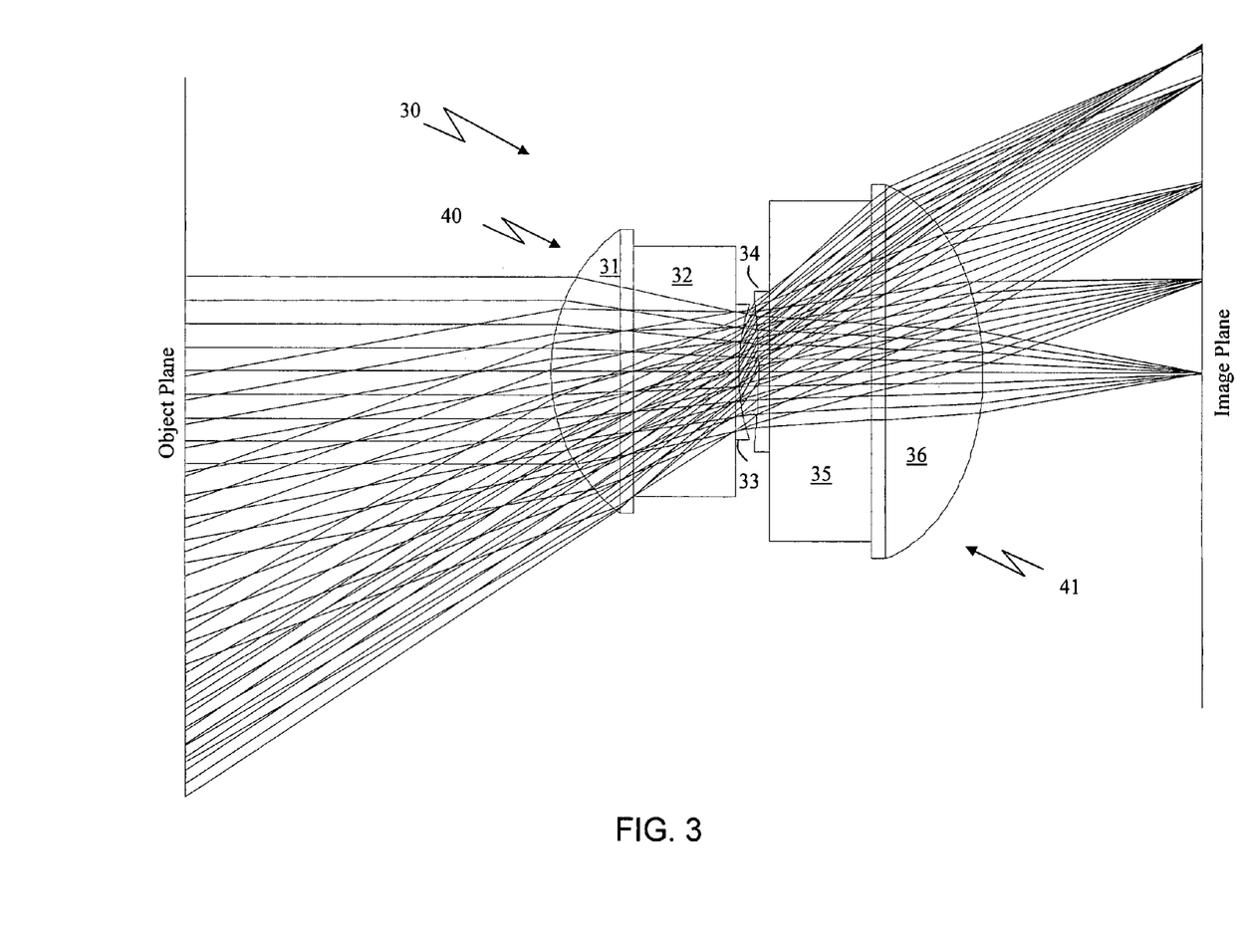
FIG. 3 is a diagram of an example lens apparatus according to an embodiment described herein.

Now referring to the figures, where like reference numbers designate like elements, FIG. 3 shows a lens system 30 according to a first embodiment. The lens system 30 is comprised of two lens structures 40, 41. The outer lens structure 40 comprises an outer positive lens 31 and outer negative lens 33, separated by substrate 32. The inner lens structure 41 comprises inner positive lens 36 and inner negative lens 34, separated by substrate 35.

In one embodiment of the lens system 30 shown in FIG. 3, the lenses 31, 32, 35, 36 are imprinted into a lens replication material. In one embodiment, the lens replication material is a low-dispersion (Abbe number>50) UV-curable polymer such as Ormocomp made by Micro Resist Technology. The substrates 32, 33 preferably comprise a float glass. One example of float glass that may be used is a boro-float glass preferably with a coefficient of thermal expansion between 2 and 5 such as Borofloat® 33 from Schott North America, Inc. Methods for placing the lens replication material on the substrates 32, 33 and methods of lens replication are described in U.S. patent application Ser. No. 12/146,306, filed Jun. 25, 2008, now U.S. Pat. No. 7,710,667, entitled Imaging Module With Symmetrical Lens System and Method of Manufacture, assigned to Micron Technology, Inc., and incorporated herein by reference.

In another embodiment of the lens system 30 shown in FIG. 3, positive lenses 31, 36 comprise a low dispersion (Abbe number>50) material such as Ormocomp and negative lenses 33, 34 comprise a high dispersion (Abbe number<50) material such as Ormocore, also made by Micro Resist Technology. Combining high and low dispersion lenses in this manner reduces chromatic aberrations. In alternative embodiments, the positive lenses 31, 36 comprise a high dispersion (Abbe number<50) material and the negative lenses 33, 34 comprise a low dispersion material (Abbe number>50).

The FIG. 3 embodiment achieves optimal symmetry (chief ray angle≈field of view angle) with inner lens structure 41 being oriented between the image plane and outer lens structure 40. In addition, lens 36 is between the image plane and lens 34, and lens 31 is between lens 33 and the object plane. The orientation of lenses 31, 33, 34, 36, however, should not be strictly limited to the configuration shown in FIG. 3, but should be understood to include varying configurations (e.g., largest lens closest to object plane) that achieve optimal symmetry.

In a desired embodiment of lens system 30 in FIG. 3, inner positive lens 36, which casts an image on the image plane of a pixel array, has a diameter larger than that of outer positive lens 31 and the negative lenses 33, 34. In addition, outer positive lens 31 has a larger diameter than the negative lenses 33, 34, and outer negative lens 33 has a smaller diameter than inner negative lens 34.

Figure 3A:
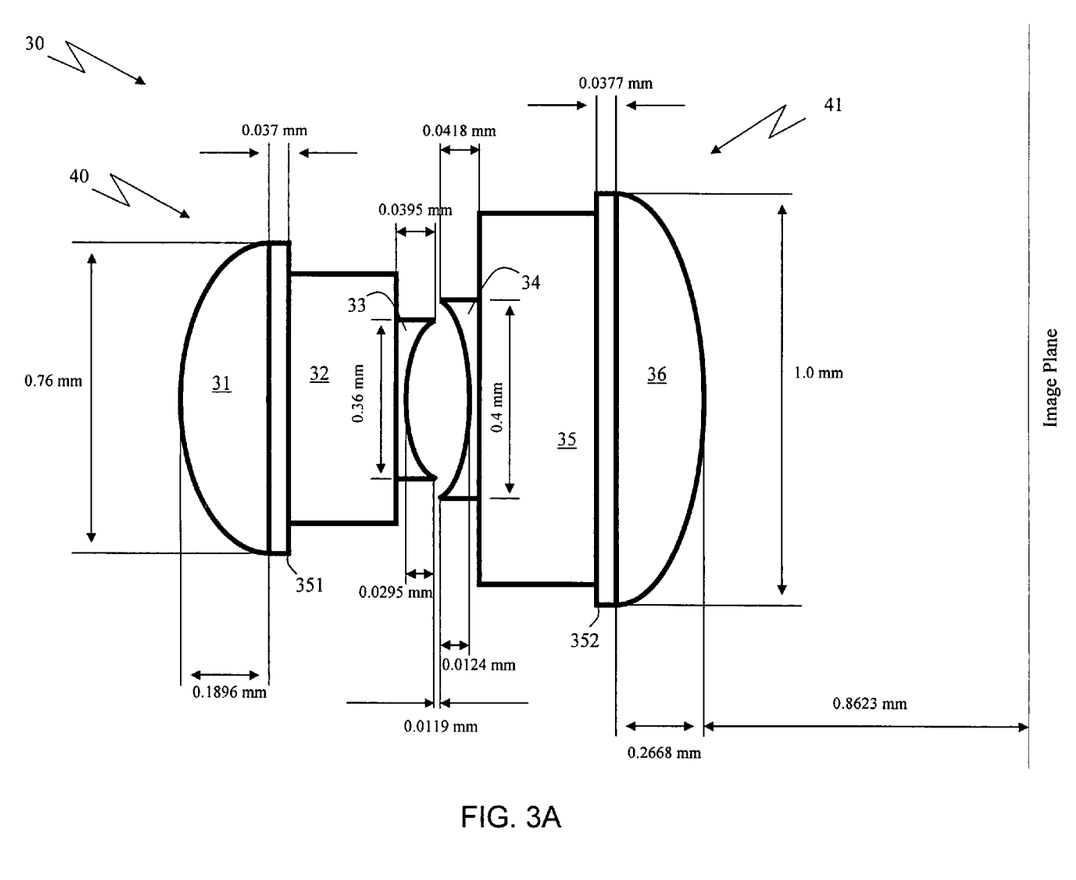
FIG. 3A is a diagram of an example lens apparatus according to an embodiment described herein.

FIG. 3A shows one non-limiting example of dimensions for the lens system 30. The outer positive lens 31, has a diameter of about 0.76 mm and a sag of about 0.1896 mm. The outer positive lens 31 also has a residual polymer thickness 351 that is about 0.037 mm. Outer negative lens 33 has a diameter of about 0.36 mm, a sag of about 0.0295 mm and a depth of about 0.0395 mm. To achieve optimal symmetry, the diameter of each lens 31, 33, 34, 36 is less than the image height on the image plane.

Still referring to FIG. 3A, the inner positive lens 36 has a diameter of about 1.0 mm and a sag of about 0.2668 mm. Inner positive lens 36 also has a residual polymer thickness 352 that is about 0.0377 mm. Inner negative lens 34 has a diameter of about 0.4 mm, a sag of about 0.0124 mm and a depth of about 0.0418 mm.

Furthermore, in the example shown in FIG. 3A, outer positive lens 31 has a radius of curvature of about 0.4883 mm, a conic constant of about 0.16 and a $6^{th}$ order aspheric coefficient of −1.8. Outer negative lens 33 has a radius of curvature of about 0.6583 mm, a conic constant of about 6.533 and a $6^{th}$ order aspheric coefficient of about −4.406. Inner negative lens 34 has a radius of curvature of about −1.7119 mm, a conic constant of about 9.560 and a $6^{th}$ order aspheric coefficient of about −4.262. Inner positive lens 36 has a radius of curvature of about −0.7697 mm, a conic constant of about 1.183 and a $6^{th}$ order aspheric coefficient of about −0.847. Lenses 31, 33, 34, 36 may also have $8^{th}$ order aspheric coefficients. While having $2^{nd}$ or $4^{th}$ order coefficients would more conform with the general optical principal of using low order aspheric coefficients, using $2^{nd}$ or $4^{th}$ order coefficients is redundant if already using radius of curvature and conic constant to define a lens.

To achieve maximum symmetry (chief ray angle≈field of view angle), as shown in FIG. 3A, the positive lenses 31, 36 have a similar shape and the negative lenses 33, 34 have a similar shape. Two lenses have similar shapes if the lenses "look spherical," the ratio of their diameters is smaller than 1:3, and the ratio of their sags is smaller than 1:5. Preferably, the ratio of their diameters is 1:1.5 and the ratio of their sags is 1:3. Lenses "look spherical" if the slope from the center of the lens to the edge of the lens has a constant sign and the rate of change of the slope from center of the lens to edge of the lens does not change by more than by a factor of 5. Preferably, the rate of change of the slope is not greater than 2.

Still referring to FIG. 3A, to achieve maximum symmetry (chief ray angle≈field of view angle), the distance between the two negative lenses 33, 34 is less than the distance between the inner positive lens 36 and the image plane. In the example lens system 30, the distance between the two negative lenses 33, 34 is about 0.0119 mm. In addition, the distance between the inner positive lens 36 and the image plane is about 0.8623 mm.

Figure 4A:
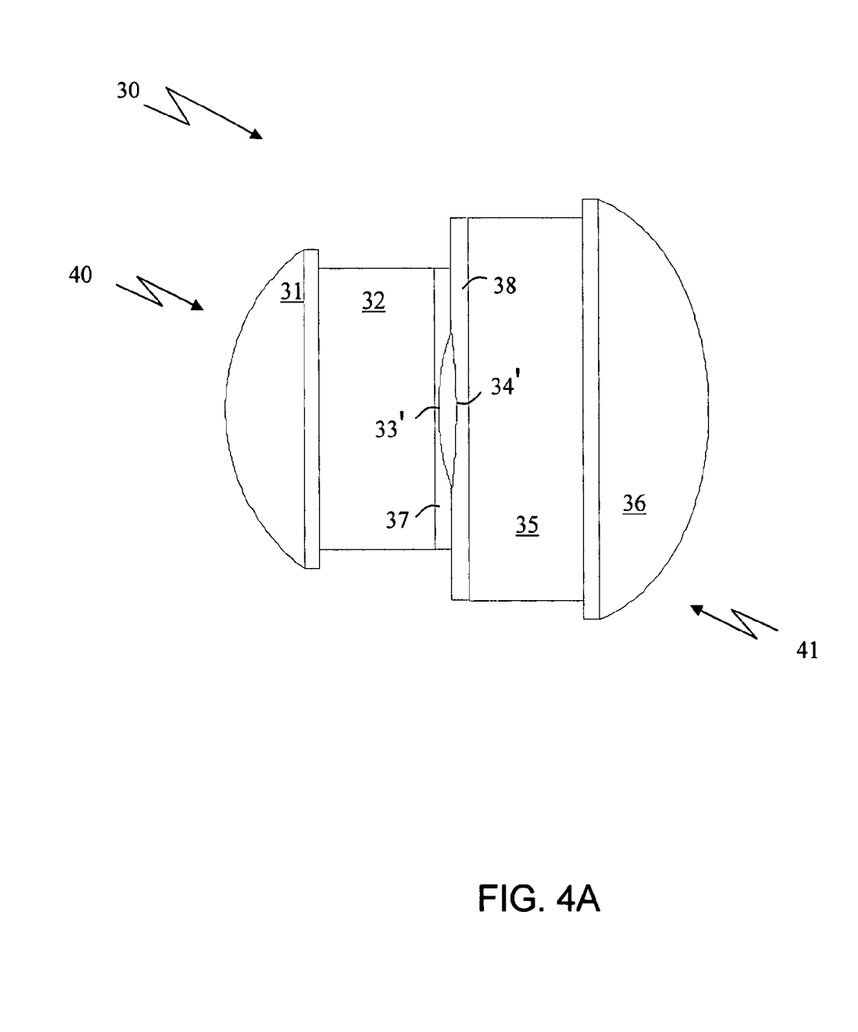
FIG. 4A is a diagram of an example lens apparatus according to an embodiment described herein.

As shown in FIG. 4A, the lens structures 40, 41 of lens system 30 in FIG. 3 can be bonded together or otherwise attached. Negative lenses 33', 34' in FIG. 4A have surfaces of the lens replication material 37, 38 extending out from the lenses 33', 34'. Bonding surfaces 37, 38 together to produce the desired air gap 39 eliminates the need for a separate spacer. In another embodiment shown in FIG. 4B, spacing structures 400, 401 with respective lengths of m and n can be imprinted directly into the polymer to achieve the desired air gap.

Figure 4B:
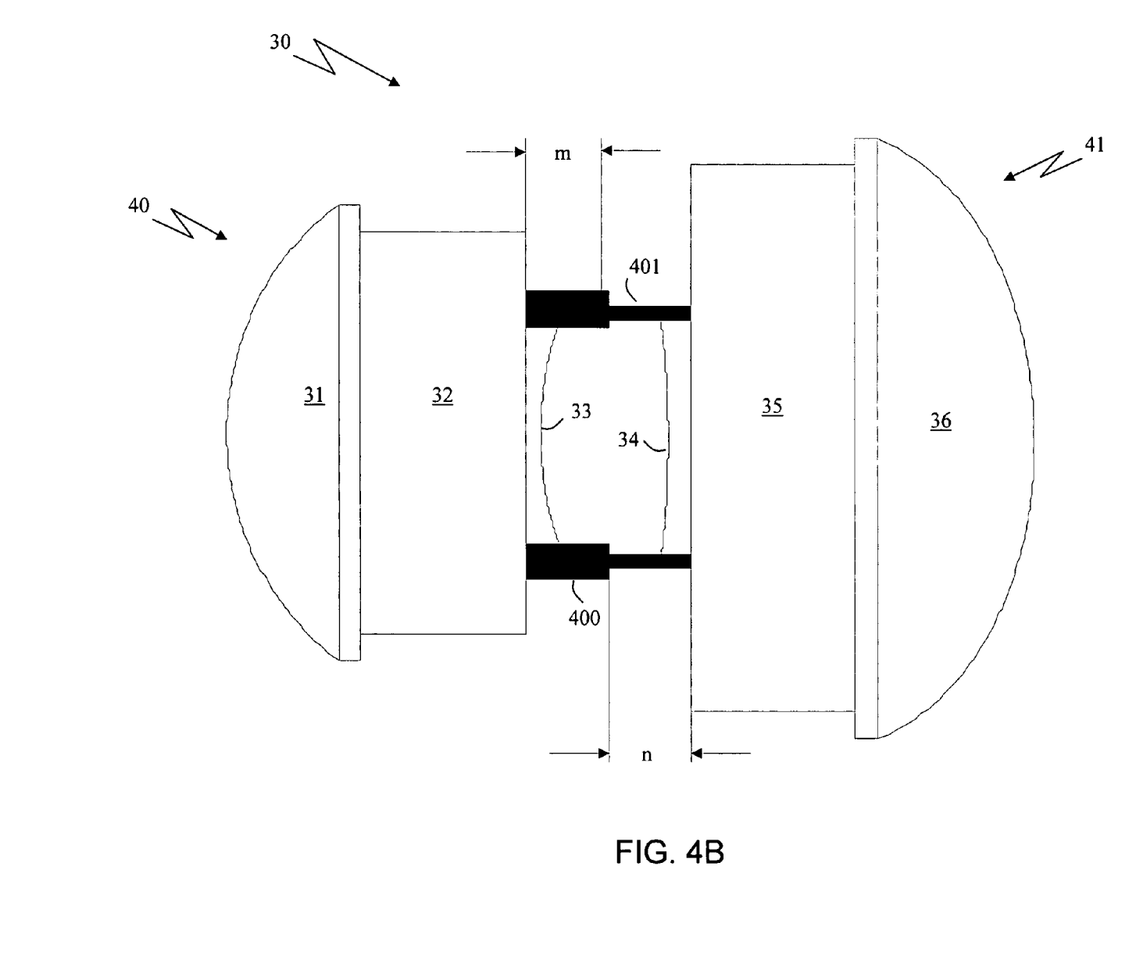
FIG. 4B is a diagram of an example lens apparatus according to an embodiment described herein.
Figure 5:
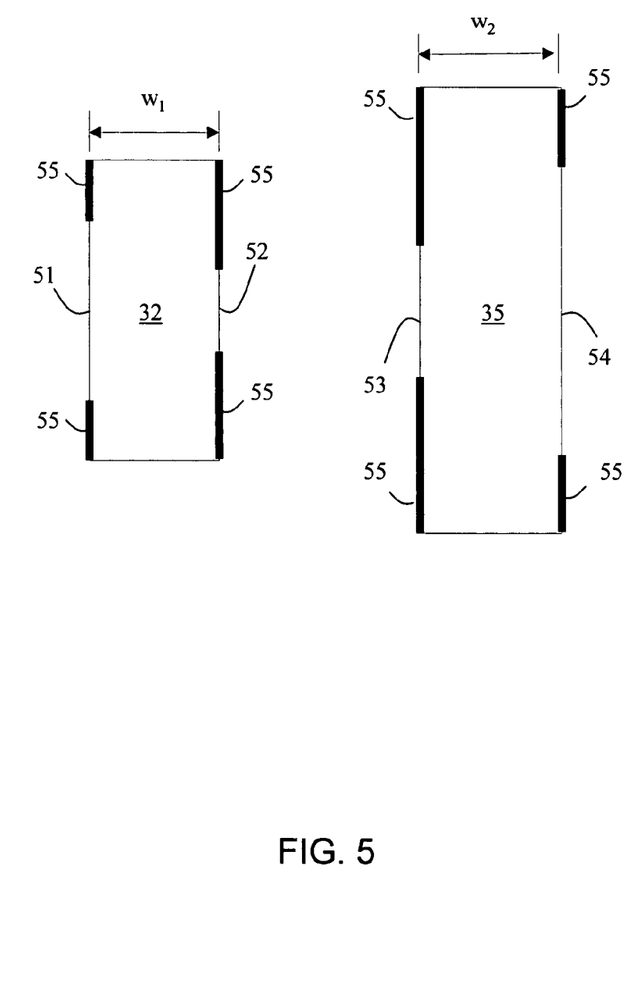
FIG. 5 is a diagram of a portion of the FIG. 3 lens apparatus according to an embodiment described herein.

FIG. 5 shows a cross-sectional view of substrates 32, 35 from FIGS. 3-4B. Substrate 32 has apertures 51, 52 such that aperture 51 is oriented between outer positive lens 31 and substrate 32 and aperture 52 is oriented between substrate 32 and outer negative lens 33. Substrate 35 has apertures 53, 54 such that aperture 53 is oriented between inner negative lens 34 and substrate 35 and aperture 54 is between substrate 35 and inner positive lens 36.

Still referring to FIG. 5, in a desired embodiment, the sizes of the apertures should be such that aperture 52 is the system stop, and apertures 51, 53, 54 are field stops that perform artificial vignetting of off-axis rays. In addition, aperture 52, as the system stop, is near a midpoint along the optical axis between the lenses 31, 33, 34, 36 to achieve near symmetry about the system stop 52. In an alternative embodiment, aperture 53 is the system stop. One non-limiting example of dimensions for the apertures is that aperture 51 is 0.67 mm, aperture 52 is 0.32 mm, aperture 53 is 0.43 mm and aperture 54 is 0.91 mm.

Still referring to FIG. 5, substrates 32, 35 have widths $w_1$, $w_2$ respectively. Widths $w_1$, $w_2$ should be a value that allows the entrance pupil to be close enough to the system stop 52 so that the system stop 52 is far enough from the other apertures 51, 53, 54 to allow the other apertures 51, 53, 54 to work as field limiting apertures. In a preferred embodiment, widths $w_1$, $w_2$ are less than 0.3 mm.

Still referring to FIG. 5, in a desired embodiment of lens system 30 (FIGS. 3-4B), substrates 32, 35 are coated with a non-reflective, light-absorbing material 55 that can be a black matrix polymer such as PSK 2000 from Brewer Science, Inc., oxidized silicon known as "dark silicon," or oxidized chromium known as "black chromium." Apertures 51, 52, 53, 54 would then exist as areas on the substrate free of light absorbing material 55. Use of the light absorbing material 55, unlike light reflecting material, will allow for false light suppression and will reduce spurious light and lens flare.

Figure 6:
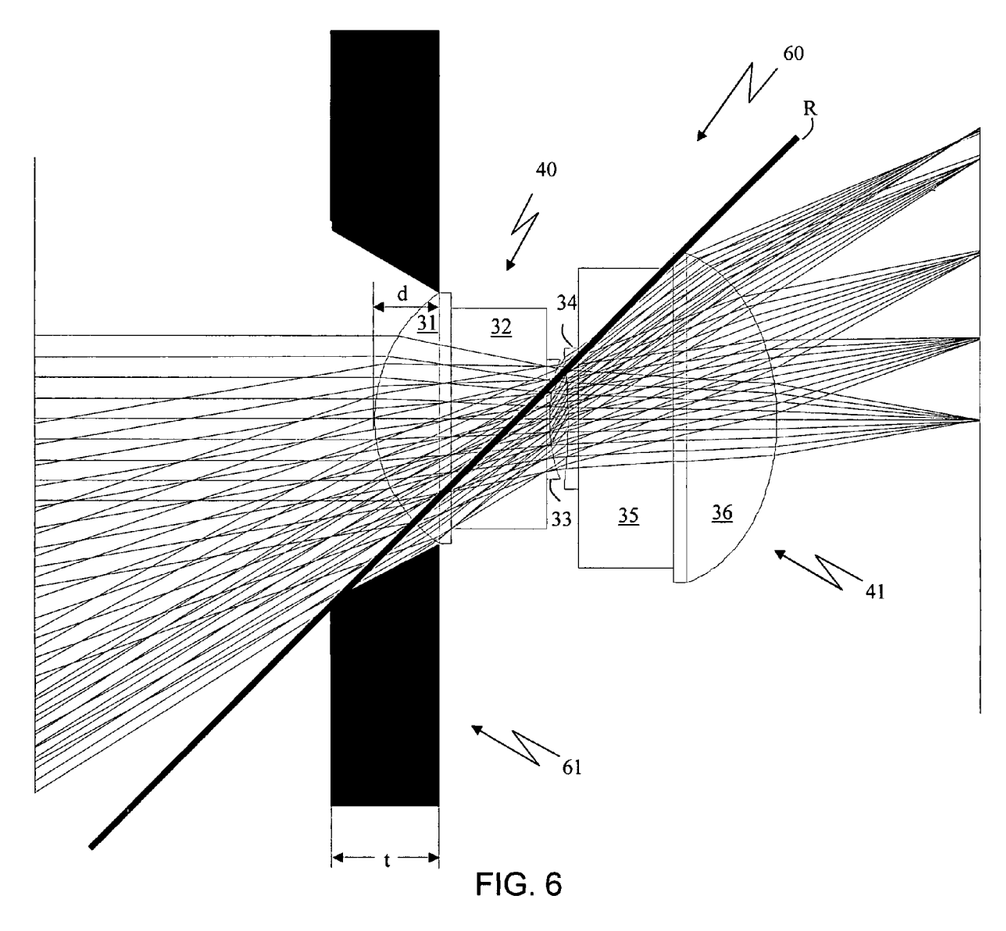
FIG. 6 is a diagram of an example lens apparatus according to another embodiment described herein.

FIG. 6 shows an alternative embodiment of a lens system 60, similar to system 30 of FIG. 3, which uses a lens hood 61 acting as another field stop to further suppress flare and spurious light. Preferably, the lens hood 61 has a thickness t that is at least slightly thicker than the depth d of outer positive lens 31. As shown in FIG. 6, any ray of a wider angle than light ray R is blocked from entering lens system 60. U.S. patent application Ser. No. 12/146,306, filed Jun. 25, 2008, now U.S. Pat. No. 7,710,667, entitled Imaging Module With Symmetrical Lens System and Method of Manufacture, and incorporated herein by reference illustrates methods for attaching the lens hood 61 to an imaging module that contains lens system 60.

Figure 7:
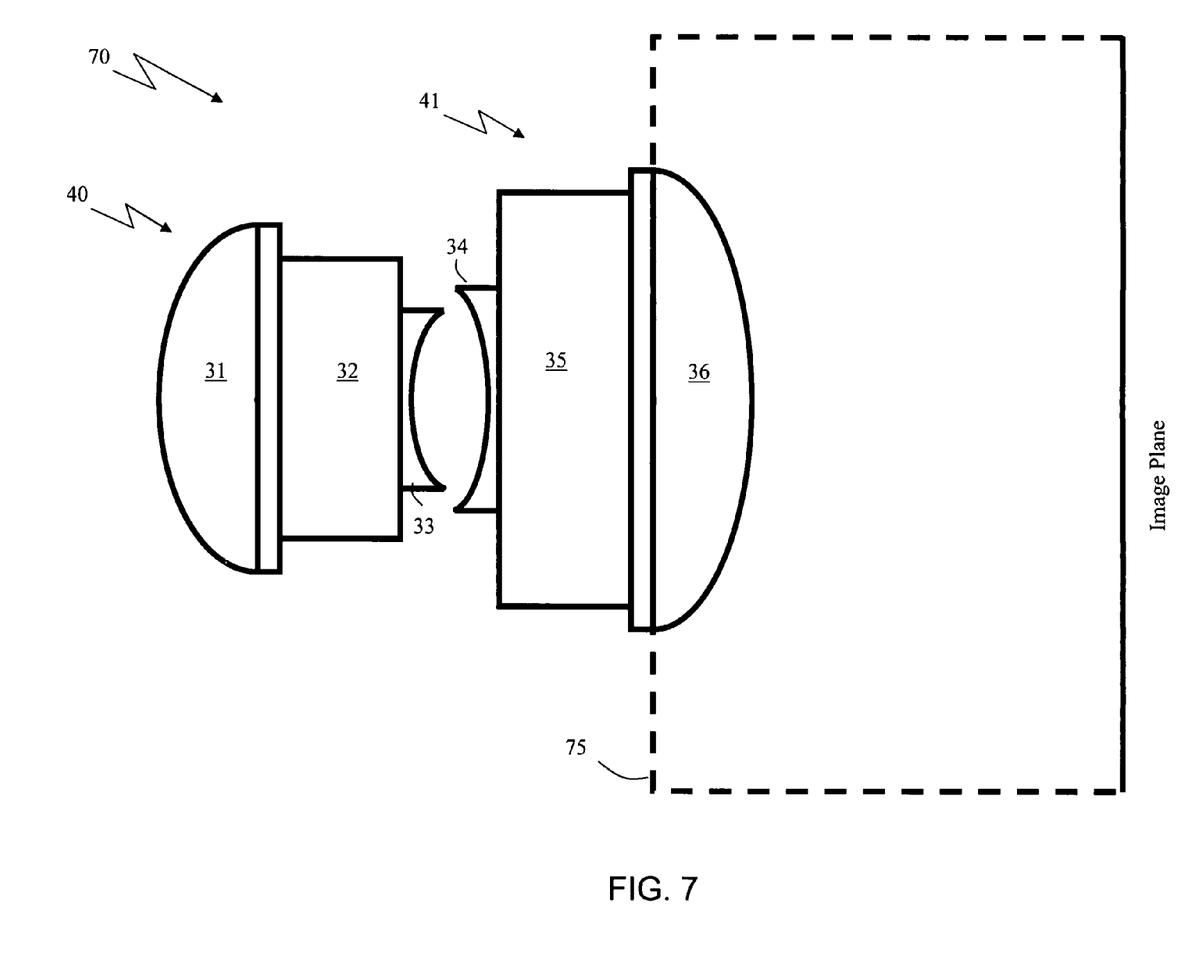
FIG. 7 is a diagram of an example lens apparatus according to another embodiment described herein.

FIG. 7 shows an alternative embodiment of a lens system 70, similar to system 30 of FIG. 3, which uses a spacer 75 between inner positive lens 36 and the image plane. Spacer is 75 is preferably circular and has an inner diameter $d_{spacer}$ of at least 2 mm. The larger the diameter $d_{spacer}$ of spacer 75, the greater the reduction in lens flare. U.S. patent application Ser. No. 12/146,306, filed Jun. 25, 2008, now U.S. Pat. No. 7,710, 667, entitled Imaging Module With Symmetrical Lens System and Method of Manufacture, and incorporated herein by reference illustrates methods for attaching the spacer 75 to an imaging module that contains lens system 70.

Figure 8:
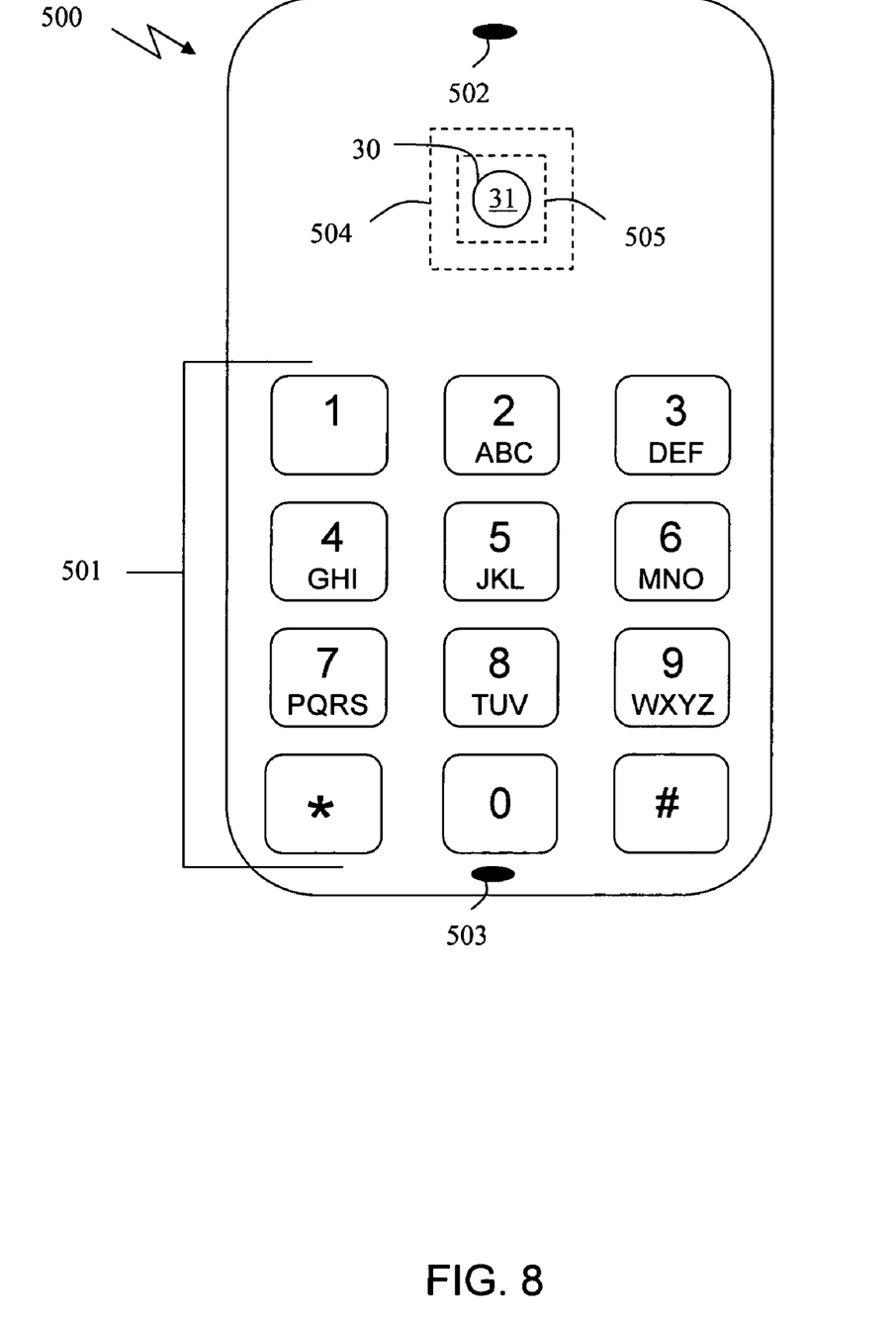
FIG. 8 is a wireless telephone comprising a lens system according to an embodiment described herein.

FIG. 8 shows a wireless telephone 500 with a keypad 501, an ear piece 502 and a microphone 503. The telephone 500, which can be a cellular telephone, also includes a digital Camera 504 that comprises a video graphics array (VGA) imaging module 505. Video graphics array module (VGA) 505 may have any resolution or pixel size. The imaging module 505 comprises lens system 30 according to embodiments described herein. Outer positive lens 31 may be exposed or may be shielded by a planar transparent cover. The elements of the telephone 500 enumerated herein are included for illustrative purposes only, and many wireless telephone configurations are possible.

What is claimed as new and desired to be protected by Letters Patent of the United States is:

1. A lens system configured as a doublet comprising:
   an inner lens structure comprising:
      an inner positive lens,
      a first transparent substrate having a first side affixed to a side of the inner positive lens, and
      an inner negative lens affixed to the second side of the first transparent substrate opposite the inner positive lens; and
   an outer lens structure comprising:
      an outer positive lens,
      a second transparent substrate having first side of the second transparent substrate being affixed to a side of the outer positive lens, and
      an outer negative lens affixed to the second side of the second transparent substrate opposite the outer positive lens.

2. The lens system of claim 1, further comprising:
   a first aperture on a first side of the first transparent substrate and a second aperture on a second side of the first transparent substrate; and
   a third aperture on a first side of the second transparent substrate and a fourth aperture on a second side of the second transparent substrate.

3. The lens system of claim 1, wherein the inner lens structure and the outer lens structure are oriented with the inner negative lens and outer negative lens facing each other.

4. The lens system of claim 1, wherein the inner lens structure is oriented between the outer lens structure and an image plane 5. The lens system of claim 4, wherein the outer positive lens receives an image and the inner positive lens places the image on the image plane.

6. The lens system of claim 1, wherein the first and second substrates comprise a float glass.

7. The lens system of claim 6, wherein the float glass is a boro-float glass having a coefficient of thermal expansion between 2 and 5.

8. The lens system of claim 1, wherein the lens system is part of a video graphics array module.

9. The lens system of claim 2, wherein the fourth aperture is the system stop.

10. The lens system of claim 2, wherein the second aperture is the system stop.

11. The lens system of claim 2, wherein the distance between the fourth aperture and the first, second and third apertures is such that at least one of the group containing the first, second and third apertures is a field limiting aperture.

12. The lens system of claim 1, further comprising a lens hood surrounding the outer positive lens.

13. The lens system of claim 12, wherein the lens hood is higher than the depth of the outer positive lens.

14. The lens system of claim 1, wherein the outer positive lens, outer negative lens, inner negative lens and inner positive lens have at most $8^{th}$ order aspheric coefficients.

15. The lens system of claim 1, wherein the outer negative lens and the inner negative lens are bonded together.

16. The lens system of claim 15, wherein at least one of the negative lenses comprises a spacer for separating the negative lenses when bonded together.

17. The lens system of claim 1, wherein the outer positive lens, outer negative lens, inner negative lens and inner positive lens each comprise a UV-curable polymer.

18. The lens system of claim 1, wherein the outer positive lens and inner positive lens each comprise a material with an Abbe number less than 50 and the inner negative lens and outer negative lens each comprise a material with an Abbe number greater than 50.

19. The lens system of claim 1, wherein the outer positive lens and inner positive lens each comprise a material with an Abbe number greater than 50 and the inner negative lens and outer negative lens each comprise a material with an Abbe number less than 50.

20. The lens system of claim 2, wherein each aperture is an opening in a light-absorbing material.

21. The lens system of claim 1, further comprising a spacer separating the inner positive lens from the image plane.

22. The lens system of claim 1, wherein diameters of the inner positive lens and outer positive lens are larger than diameters of the inner negative lens and outer negative lens.

23. The lens system of claim 1, wherein a distance between the inner negative lens and outer negative lens is less than a distance from the inner positive lens to an image plane.

24. The lens system of claim 1, wherein the first and second transparent substrates each have thicknesses less than 0.3 mm.

25. The lens system of claim 1, wherein the outer positive lens and inner positive lens have a similar shape, and the outer negative lens and inner negative lens have a similar shape.

26. The lens system of claim 1, wherein an angle of incidence (AOI) of the lens system and a corresponding chief ray angle (CRA) is defined as:

$$0.75*AOI \leq CRA \leq 1.25*AOI.$$

27. The lens system of claim 1, wherein the diameter of each lens is less than an image height on an image plane.

28. A wireless telephone comprising:
a digital camera comprising an imaging module comprising a lens system comprising:
  an inner lens structure comprising:
    an inner positive lens,
    a first transparent substrate having a first side affixed to a side of the inner positive lens, and
    an inner negative lens affixed to the second side of the first transparent substrate opposite the inner positive lens; and
  an outer lens structure comprising:
    an outer positive lens,
    a second transparent substrate having first side of the second transparent substrate being affixed to a side of the outer positive lens, and
    an outer negative lens affixed to the second side of the second transparent substrate opposite the outer positive lens.

29. The wireless telephone of claim 28, further comprising:
a first aperture on a first side of the first transparent substrate and a second aperture on a second side of the first transparent substrate; and
a third aperture on a first side of the second transparent substrate and a fourth aperture on a second side of the second transparent substrate.

30. The wireless telephone of claim 28, wherein the imaging module is a video graphics array module.

31. The wireless telephone of claim 28, wherein the outer positive lens and inner positive lens each comprise a material with an Abbe number less than 50 and the inner negative lens and outer negative lens each comprise a material with an Abbe number greater than 50.

32. An imaging module comprising a lens doublet, the lens doublet comprising:
an inner lens structure comprising:
  an inner positive lens,
    a first transparent substrate having a first side affixed to a side of the inner positive lens, and
    an inner negative lens affixed to the second side of the first transparent substrate opposite the inner positive lens; and
an outer lens structure comprising:
  an outer positive lens,
    a second transparent substrate having first side of the second transparent substrate being affixed to a side of the outer positive lens, and
    an outer negative lens affixed to the second side of the second transparent substrate opposite the outer positive lens.

33. The imaging module of claim 32, further comprising:
a first aperture on a first side of the first transparent substrate and a second aperture on a second side of the first transparent substrate; and
a third aperture on a first side of the second transparent substrate and a fourth aperture on a second side of the second transparent substrate.

34. The imaging module of claim 32, wherein the imaging module is a VGA imaging module.

35. The imaging module of claim 32, wherein the outer positive lens and inner positive lens each comprise a material with an Abbe number less than 50 and the inner negative lens and outer negative lens each comprise a material with an Abbe number greater than 50.

36. A wafer-level lens system comprising:
an inner lens structure comprising:
  an inner positive lens,
    a first transparent substrate having a first side affixed to a side of the inner positive lens, and
    an inner negative lens affixed to the second side of the first transparent substrate opposite the inner positive lens; and
an outer lens structure comprising:
  an outer positive lens,
    a second transparent substrate having first side of the second transparent substrate being affixed to a side of the outer positive lens, and
    an outer negative lens affixed to the second side of the second transparent substrate opposite the outer positive lens.

37. The wafer-level lens system of claim 36, further comprising:
a first aperture on a first side of the first transparent substrate and a second aperture on a second side of the first transparent substrate; and
a third aperture on a first side of the second transparent substrate and a fourth aperture on a second side of the second transparent substrate.

* * * * *